United States Patent
Bardon

(10) Patent No.: US 6,691,230 B1
(45) Date of Patent: Feb. 10, 2004

(54) METHOD AND SYSTEM FOR EXTENDING JAVA APPLETS SAND BOX WITH PUBLIC CLIENT STORAGE

(75) Inventor: Didier D. Bardon, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/173,384

(22) Filed: Oct. 15, 1998

(51) Int. Cl.[7] .............................................. G06F 12/19
(52) U.S. Cl. ...................................... 713/200; 717/116
(58) Field of Search ............................... 713/200, 201, 713/202; 717/116, 118

(56) References Cited

U.S. PATENT DOCUMENTS

| | | | | |
|---|---|---|---|---|
| 5,974,549 A | * | 10/1999 | Golan ........................ | 712/239 |
| 6,044,467 A | * | 3/2000 | Gong ......................... | 713/200 |
| 6,125,447 A | * | 9/2000 | Gong ......................... | 713/154 |
| 6,167,522 A | * | 12/2000 | Lee et al. ................... | 713/165 |
| 6,275,938 B1 | * | 8/2001 | Bond et al. ................. | 713/200 |
| 6,321,334 B1 | * | 11/2001 | Jerger et al. ............... | 710/107 |

OTHER PUBLICATIONS

L. Gong (Dec. 1997) Going Beyond the Sandbox: An Overview of the New Security Architecture in the Java Development Kit 1.2. Proceedings of the USENIX Symposium on Internet Technologies and Systems: Monterey, CA.*

Fritzinger, J. Steven et al, "Java ™ Security", Sun Microsystems, Inc., 1996.*

Lehto, Lassi, "Java Security", Helsinki University of Technology, Telecommunications Software & Multimedia Laboratory, 1997, entire document.*

* cited by examiner

Primary Examiner—Ayaz Sheikh
Assistant Examiner—Ronald Baum
(74) Attorney, Agent, or Firm—Leslie A. Van Leeuwen; Bracewell & Patterson, L.L.P.

(57) ABSTRACT

A Java applet sandbox, provided by restrictions originally set by the manufacturer of a Java enabled Internet browser, may be securely extended by introducing the notion of public and private client storage. In addition to the sandbox, users are given means of declaring a portion of the user machine's disk space as Public. The public disk space is accessible to executing applets and is installed in addition to the standard sandbox. The modality of access may be defined with various levels of restriction by the user within the security manager. Restriction levels of the Public space may range from clearing (from the Public space) any data left after the applet has terminated, to allowing an executable applet to be moved into the private area on the user's disk drive.

12 Claims, 7 Drawing Sheets

METHOD AND SYSTEM FOR EXTENDING JAVA APPLETS SAND BOX WITH PUBLIC CLIENT STORAGE

BACKGROUND OF THE INVENTION

1. Technical Field

The present invention relates in general to data processing systems and in particular to data processing systems utilizing Java applets with a Java-enabled internet browser. More particularly, the present invention relates to utilization of Java applets, retrieved from an internet site, on a user's machine. Still more particularly, the present invention relates to extension of a pre-defined "sandbox" for use with Java applets on a user's machine.

2. Description of the Related Art

Java™ ("Java") is a programming language developed by Sun Microsystems, of Mountain View, Calif. Java's portability, security, and intrinsic distributed programming support features make this language useful for Internet programming. The Internet and the World Wide Web allows access by virtually any operating system, thus requiring construction of Internet and Web sites utilizing a programming language that is operating system independent. Java is a totally object-oriented, operating system independent programming language which achieves architectural independence by compiling source code into its own intermediate representation. Java source code is not compiled into any particular machine code, but is translated into code for a virtual machine specifically designed to support Java's features. A Java interpreter or a Java-enabled browser then executes the translated code. While Java source code must be compiled, no link step is required since the Java interpreter dynamically links the translated code at run time.

FIG. 2 illustrates how Java™ achieves operating system independence utilizing the Java Virtual Machine ("JVM") 202. JVM 202 resides on host operating system 204, functioning within hardware 206, and all Java applications 200 run on top of JVM 202. Operating system 204 may include Windows™, an operating system of Microsoft, Inc. of Redmond Wash.; MAC™ OS, an operating system of Apple Computer Corporation of San Jose, Calif., and other suitable operating systems. JVM 202 buffers Java applications 200 from system differences and creates a virtual machine (data processing system) that is constant between various systems.

Java became popular for use on Internet and World Wide Web sites because of the popularity and utility of the Internet. Many different operating systems are capable of accessing web sites through browsers such as Netscape™ and Internet Explorer™, products of Netscape, Inc. of San Jose, Calif. and Microsoft Corporation, Redmond, Wash., respectively. Therefore, the Internet and web sites have to be accessible by browsers that use different operating systems and languages.

Java applets are operating system-independent programs that may be downloaded, via the Internet, to a disk drive and executed on a user's data processing system. To protect the user's data processing system ("computer"), the designers of Java have defined a "sandbox;" a set of restrictions and an area on the disk within which the downloaded applet is allowed to operate. Applets within a sandbox, generally, are not permitted to access the computer file system, they may only initiate network connections to the computer from which they were downloaded. The restrictions, provided by Java's security model, protect the user from downloaded hostile code.

FIG. 3 depicts a high-level block diagram of a conventional security process in a data processing system. Security problems are intensified when binary code is downloaded to a data processing system. Binary code is not as easy to inspect as interpreted languages, such as Java. As indicated, data processing system 300 includes security manager 304 installed as a barrier/filter between remote (downloaded) code 308 and operating system 302. Local code 306, or applications that are resident on data processing system 300, are not filtered by security manager 304. Generally, users rely on security measures that may not have been updated and may not adequately protect the machine. Also, the security of a user's machine depends on the user to perform the security scan (virus scan) and the user relies on the adequacy of the scanning software.

FIG. 4 illustrates a high-level block diagram for a typical security procedure for a Java Virtual Machine operating in a data processing system. In data processing system 400, Java Virtual Machine (JVM) 404 resides on the host operating system 402. JVM 404 permits multiple class loaders 408 and 412, to be active simultaneously. Class loader 408, loads local classes from JDK (Java Developer Kit) 410 created by Java applications on the local operation system. Applet class loader 412 loads remote, or downloaded, classes.

In Java, both unsafe (untrusted) byte code 416 and safe byte code 418 are loaded through byte code verifier 414. All Java source code is compiled into operating system independent byte-code. As indicated, local Java source code 422 compiled through Java compiler 420 resulting in "safe" byte code must be verified through byte code verifier 414. JVM 404 will only execute code that passes byte code verifier 414.

As a Java applet or program starts up it makes a request to the Java security manager for specific privileges. The security manager determines if the privileges are to be granted and if so, they are stored on the program's stack as a series of approved capabilities. The Java system library will check the stack looking for these capabilities before performing any security-critical actions. The combination of the Java class loader, the byte-code verifier, and the language design itself assures that an applet cannot simply access memory or restricted areas on the disk drive.

The Java applet sandbox has been successful in establishing a level of trust in network computing, but it has also put narrow limits on what may be done for users with applets. With the development of electronic commerce and other Internet based transactions, the sandbox becomes too restrictive and means to extend it in a secure fashion are needed.

It would be desirable, therefore, to provide a method and apparatus that would provide a sandbox that is securely extendable on a user's machine. Also, it would be desirable to provide various levels of restriction defining various modalities of access.

SUMMARY OF THE INVENTION

It is therefore one object of the present invention to extend the Java applet sandbox that may be available on a user's disk drive.

It is yet another object of the present invention to allow applets to permit applet data on the disk drive after an applet execution has terminated.

It is a further object of the present invention to provide more than one set of restrictions to define different levels of access.

The foregoing objects are achieved as is now described. A Java applet sandbox, provided by restrictions originally set by the manufacturer of a Java enabled Internet browser, may be securely extended by introducing the notion of public and private client storage. In addition to the sandbox, users are given means of declaring a portion of the user machine's disk space as "public." The public disk space is accessible to executing applets and is installed in addition to the standard sandbox. The modality of access may be defined with various levels of restriction by the user within the security manager. Restriction levels of the public space may range from clearing (from the Public space) any data left after the applet has terminated, to allowing an executable applet to be moved into the private area on the user's disk drive.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
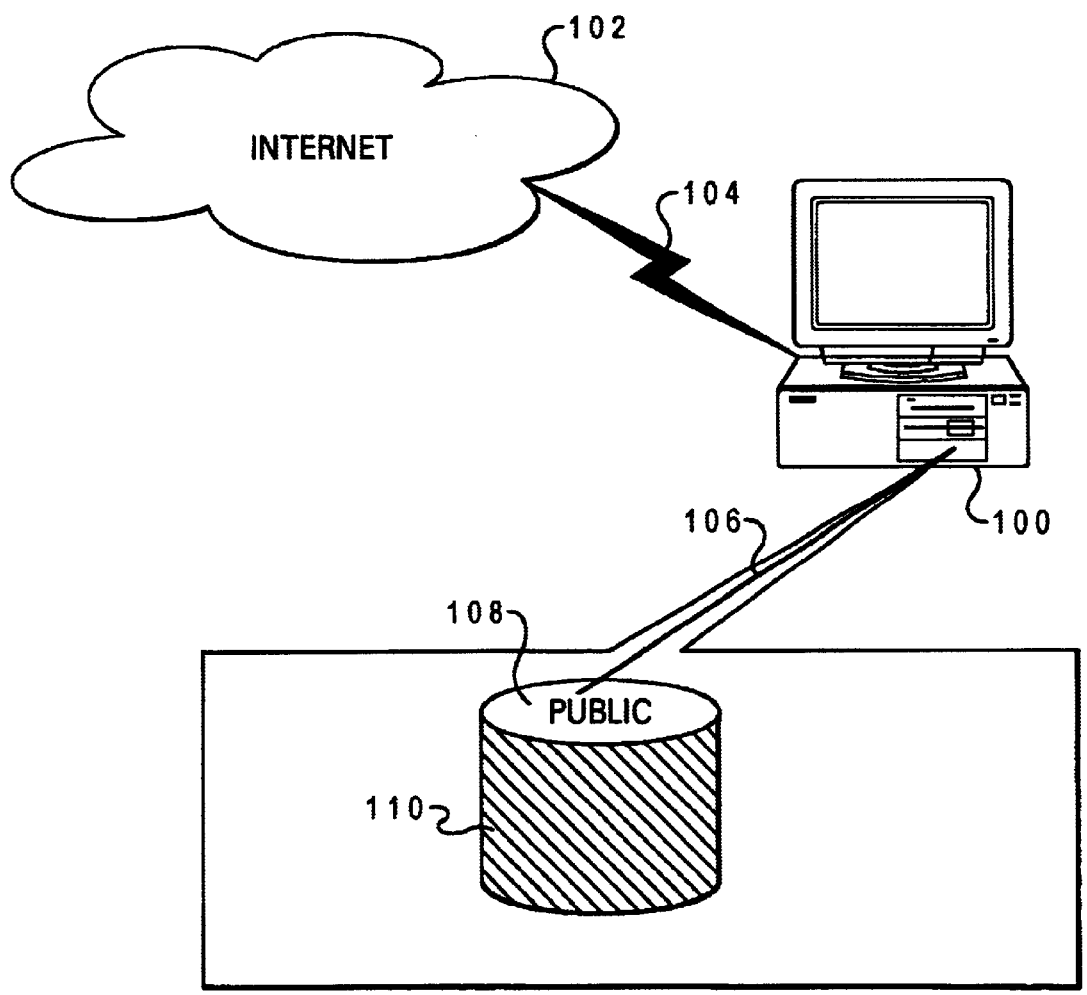
FIG. 1 depicts a high-level block diagram of a data processing system connected to the Internet in which a preferred embodiment of the present invention may be implemented.
Figure 2:
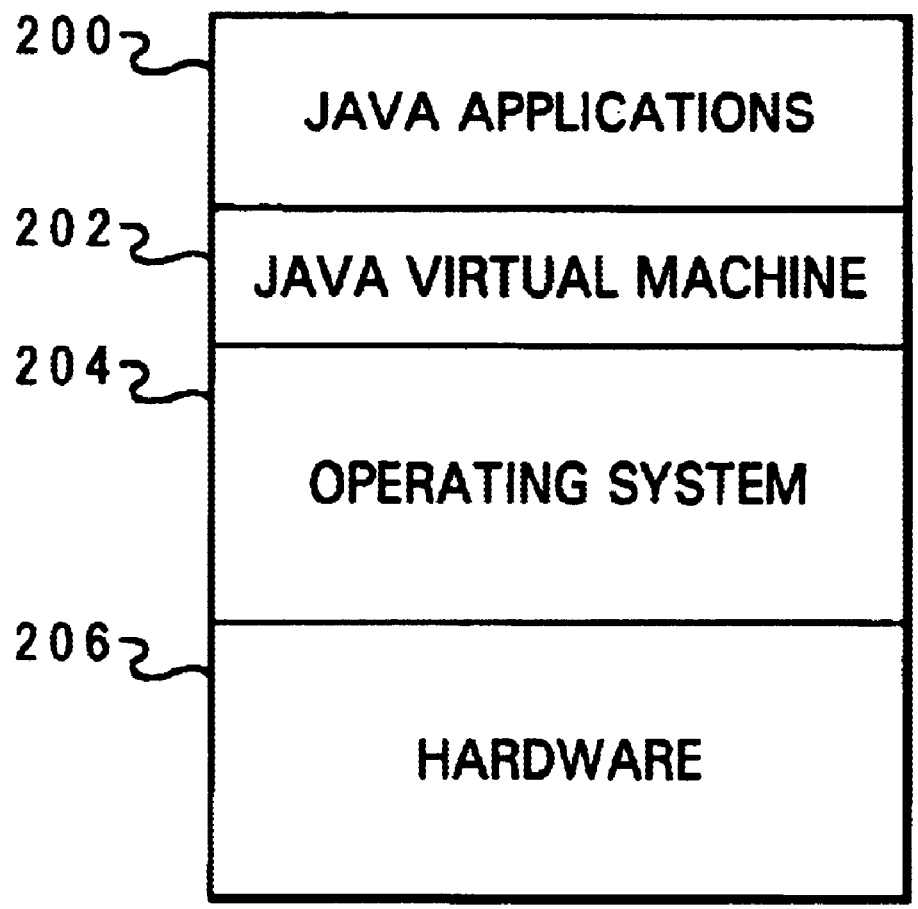
FIG. 2 is a high-level block diagram of the operating hierarchy of a Java Virtual Machine on a data processing system in accordance with a preferred embodiment of the present invention.
Figure 3:
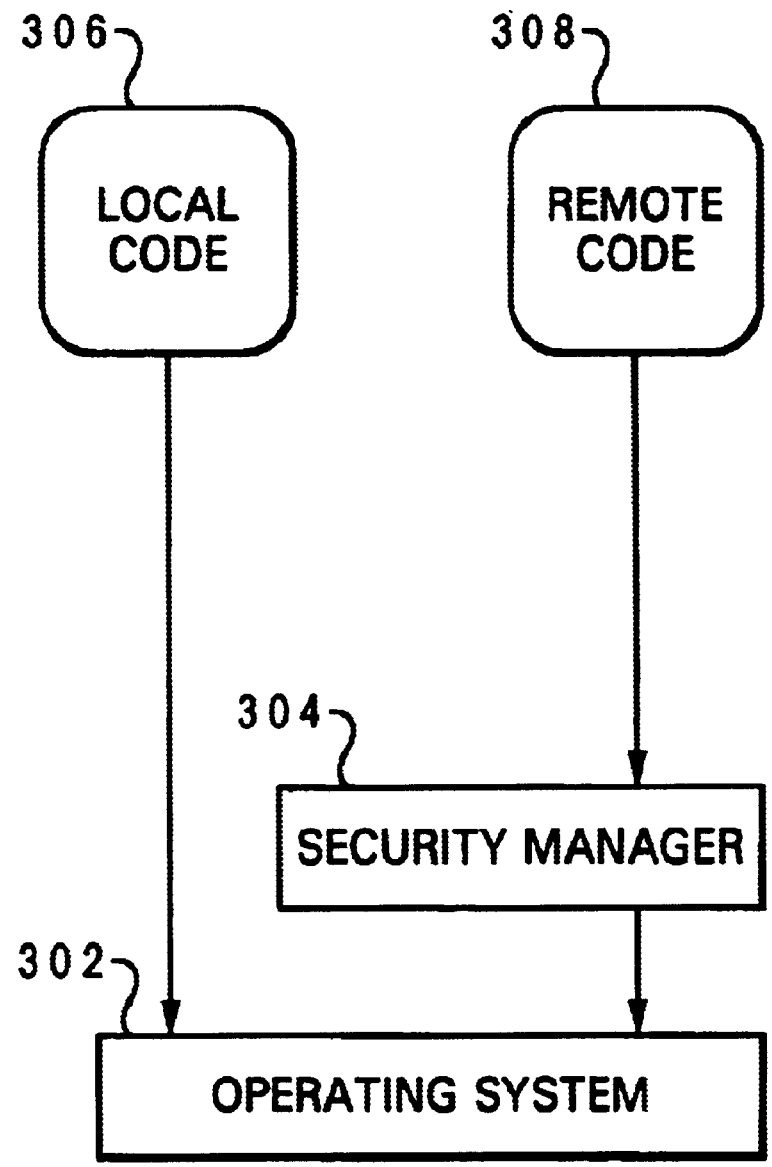
FIG. 3 depicts a high-level flow diagram of a conventional security process in a data processing system.
Figure 4:
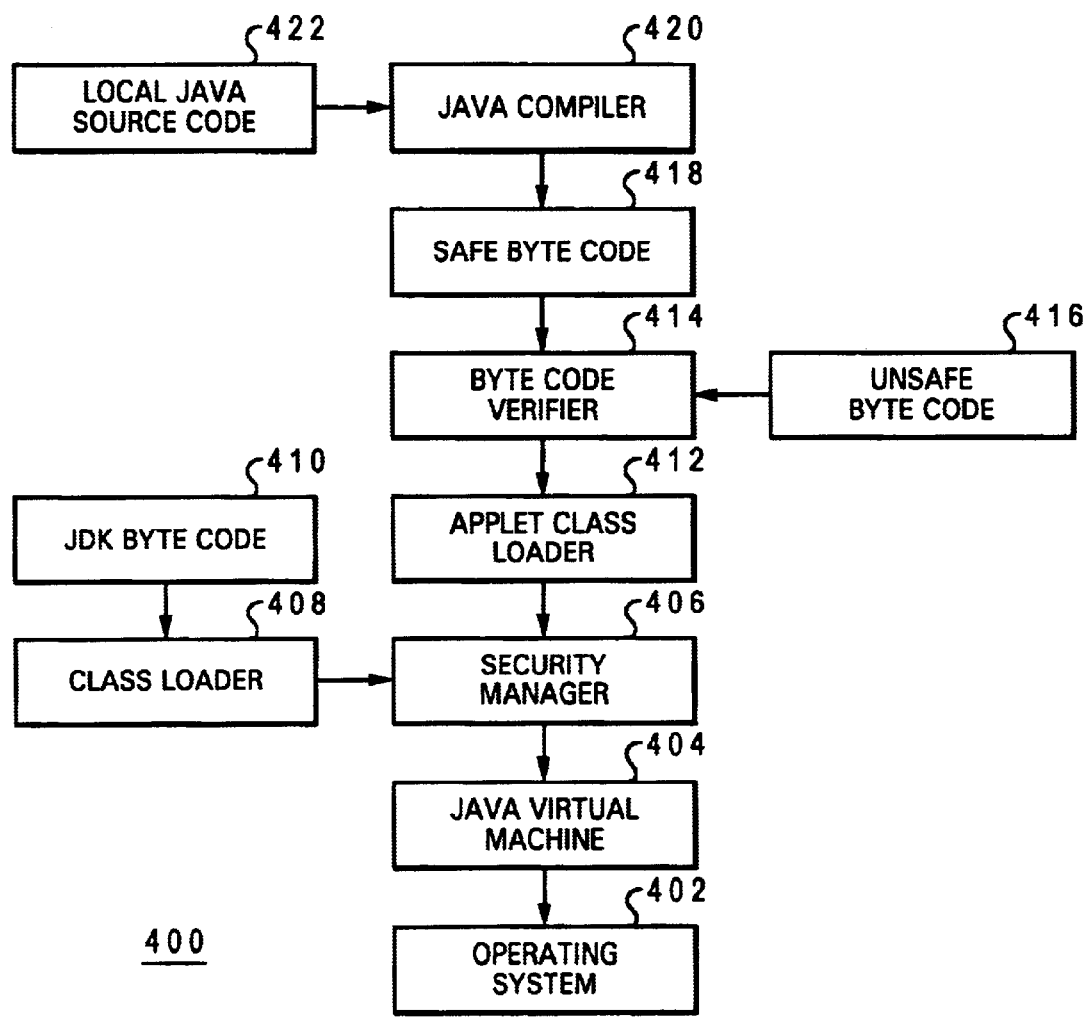
FIG. 4 is a typical high-level security procedure for a Java Virtual Machine operating in a data processing system in accordance with a preferred embodiment of the present invention.

With reference now to the figures, and in particular with reference to FIG. 1, a high-level block diagram of a data processing system connected to the Internet and the subsequent connection to a sandbox partition on the data processing system disk drive, in which a preferred embodiment of the present invention may be implemented, is depicted. The exemplary embodiment depicted includes data processing system 100 connected to the Internet 102 via communications link 104. Communications link 104 may be in the form of access provided by an Internet Service Provider ("ISP") or via a proxy within a firewall, as is known in the art. Data processing system 100 may include a Java-enabled browser that allows data processing system 100 to retrieve and display information and to run Java applets or a Java interpreter. Also, the browser may allow data processing system 100 to execute Java applications. The browser is a software program that provides communication between the user's computer (data processing system) and a website (not shown) on Internet 102.

System Bus 106 is interconnected between data processing system 100 processor (not shown), data processing system memory (not shown) and data processing system disk 110. Data and programs may be downloaded from a website (not shown) via Internet 102 and transmitted from data processing system 100 to disk storage 110 via system bus 106. Public storage 108 is a section of disk storage 110 defined by restrictions programmed by a user into the Security Manager of a Java Virtual Machine. The restrictions (or policies, will be used interchangeably here) are in place to hold and restrict applet (Java based programs) execution to a specified section of disk storage 110. Public space 110 is installed by the Security Manager in addition to any applet security (usually termed "sandbox") previously defined by the manufacturer of the browser. The balance of disk storage 110 is designated private storage and user program applications are permitted to operate from that area. Public storage 108 is predefined by the user and programmed into the Java Virtual Machine and limits any program applications downloaded from the Internet to Public storage 108.

Figure 5:
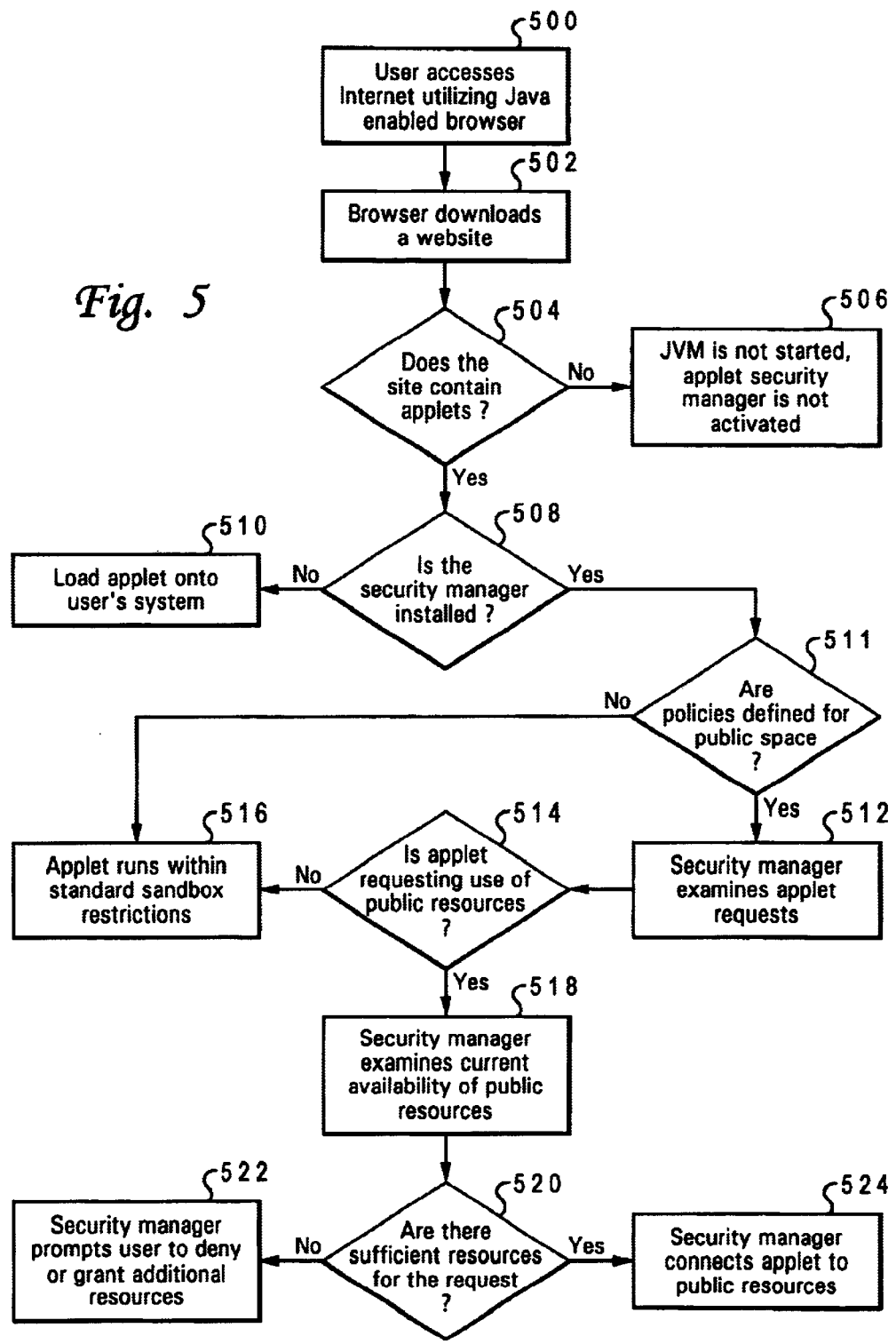
FIG. 5 is a high-level logic flow chart for extending a Java sandbox in which a preferred embodiment of the present invention may be implemented.

Referring now to FIG. 5, a high-level logic flow chart of a method for extending a Java applets sandbox in accordance with a preferred embodiment of the present invention, is illustrated. The process begins with step 500, which depicts a user accessing the Internet with a Java enabled browser. Security for the JVM associated with the browser is determined initially by browser policies that were programmed into the browser by the manufacturer. The process proceeds to step 502, which illustrates the browser downloading a website. A website may transmit graphics, data and java applets to the users data processing system. The process then passes to step 504, which depicts the determination of whether or not the site contains applets. If the site does not contain applets, the process then proceeds to step 508, which illustrates the non-initiation of the JVM and the security manager not being activated.

The JVM starts up without a security manager and if the application has been programmed properly, it will install a security manager. Initially, the Security Manager may install a sandbox if restrictions have been previously set by the browser manufacturer. If the site does contain applets, the process instead passes to step 508, which depicts a determination of whether or not a security manager is installed. If not, the process continues to step 510, which illustrates the applet being loaded onto the user's system without restrictions. If there is a security manager installed, the process proceeds to step 511, which depicts a determination of whether there are restrictions/policies in place in the security manager defining a Public space. If there are no policies in place, the process then proceeds to step 516, which illustrates the applet running within the manufacturer-defined sandbox. If the Public space is defined, the process passes instead to step 512, which depicts the security manager examining requests by downloaded applets. The security manager will compare the requests by the applet to the restrictions previously set up by the manufacturer and, in this instance, the user. The process then passes to step 516, which illustrates a determination of whether the applet is requesting use of public resources. Comparing the request to the programmed restrictions, if the applet is not requesting use of public resources, the process then continues to step 518, which depicts the applet running within the basic sandbox established by the manufacturer's restrictions.

If the applet is requesting the use of public resources, the process instead proceeds to step 520, which illustrates the security manager examining the availability of public resources. The process next passes to step 522, which depicts a determination of whether or not there are sufficient resources to accommodate the applet request. If there are not enough resources, the process continues to step 524, which illustrates the security manager prompting the user to deny access or to grant additional resources for applet execution.

Figure 6A:
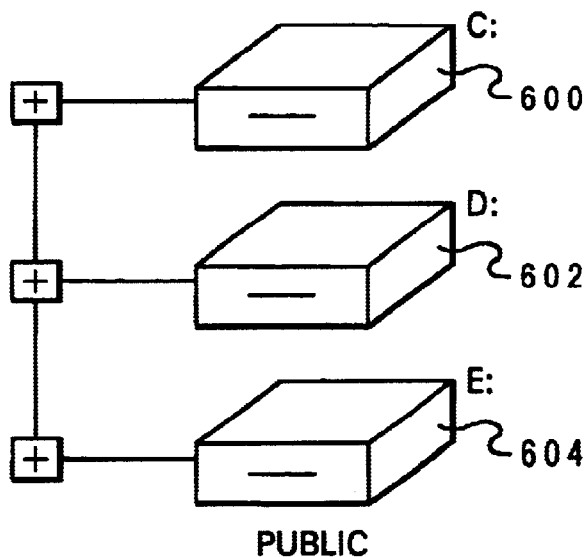
FIGS. 6A and 6B depict a block diagram of a user view of the public/private storage method, in accordance with a preferred embodiment of the present invention.
Figure 6B:
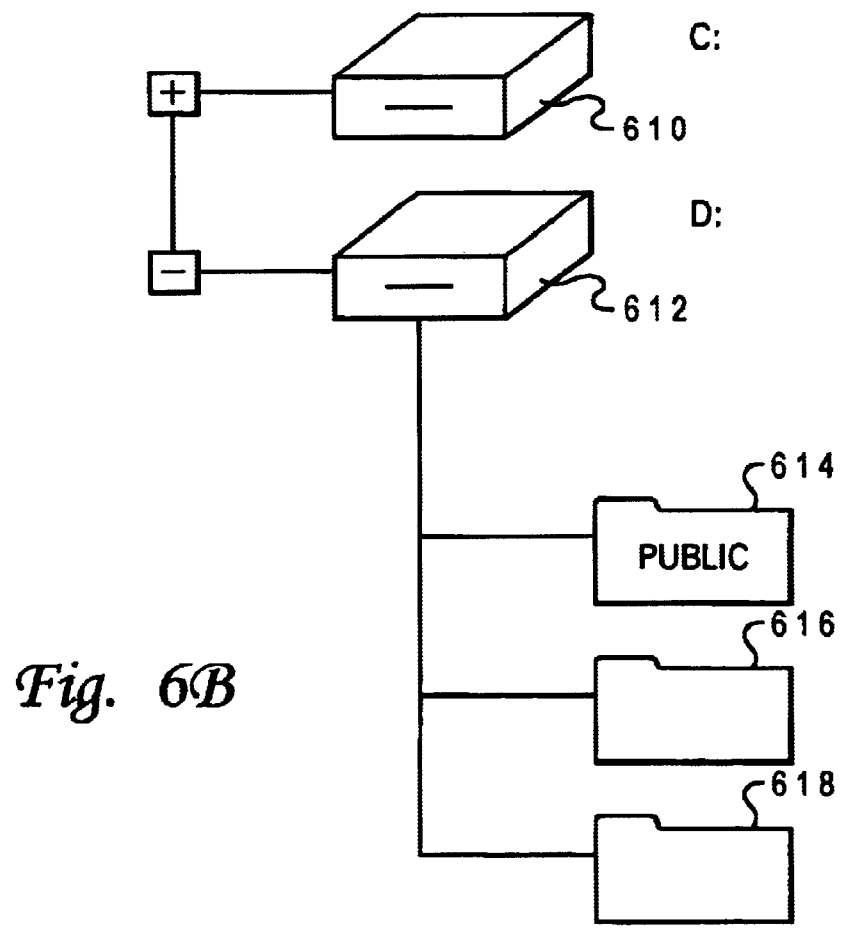

Referring now to FIGS. 6A and 6B, a block diagram of a user view of the method for extending a Java sandbox in accordance with a preferred embodiment of the present invention, is depicted. The block diagram in FIG. 6A represents a disk drive on a user's computer. The drive is partitioned, in this instance, into three drive spaces, C drive 600, D drive 602, and E drive 604. In this embodiment, the user has specified E drive 604, a partition of the disk drive, to be Public. Since partitions have set sizes, the storage space and all contents within the partition are accessible to any applet downloaded and allowed to operate in E drive 604, the designated Public space. By inheritance, all file folders within E drive 604 are also accessible to the applet.

Referring to FIG. 6B, a second block diagram of a user view of the method for extending a Java sandbox in accordance with a preferred embodiment of the present invention, is illustrated. A user's disk drive may be partitioned into two drives; C drive 610 and D drive 612. Directories on D drive 612 are illustrated by folders 614, 616 and 618. Public folder 614 has been specified, by the user, to be public and the user has set a maximum size for it. All storage space in public folder 614 is accessible to applets and so are the contents. Within each folder are individual files which may be execution files, data files, text files, etc.

The user may create a public storage space on partitioned disk drive E 604, or within a directory (folder) 614 in a system that supports Graphical User Interface ("GUI") by accessing a property sheet of the partition on drive E 604 or folder 614. A property sheet is a user programmable graphic of properties of the target storage resource (E drive 604 or folder 614). Generally, the property sheet has a security level that restricts access to network (in this instance Internet) users and a password may be required to access a private directory, partition or disk. Usually, all storage resources on a user's disk drive are private. However, a public resource is defined by the user to be freely accessible by any application.

Figure 7:
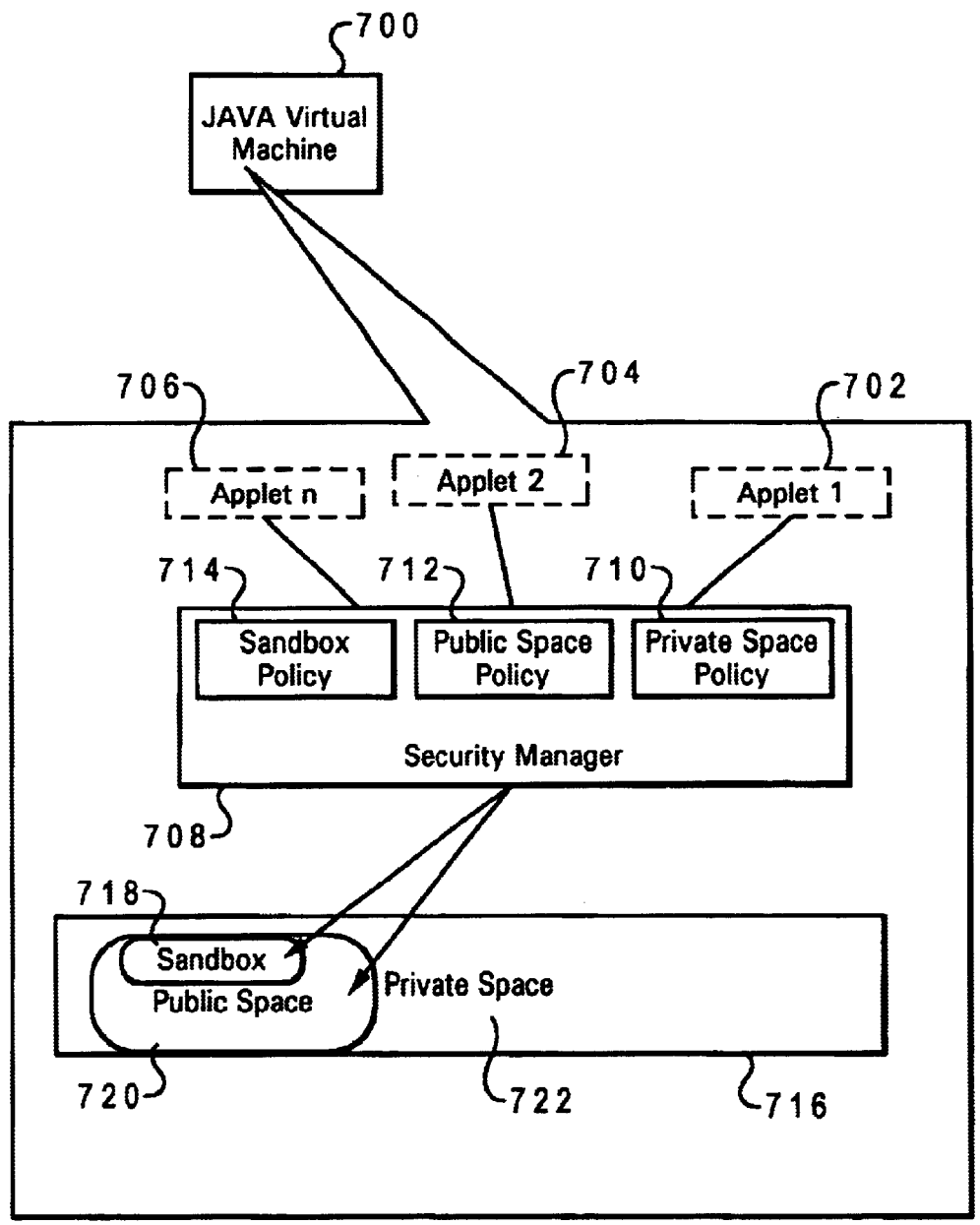
FIG. 7 illustrates a block diagram of a Security Manager applying pre-defined restrictions/policies to downloaded applets in accordance with a preferred embodiment of the present invention.

Referring to FIG. 7, a block diagram of a Security Manager applying pre-defined restrictions/policies to downloaded applets in accordance with a preferred embodiment of the present invention, is depicted. Java Virtual Machine 700 contains Security Manager 708 and Security Manager 708 is a control buffer between downloaded applets 702, 704 and 706 and a user's data processing system. Applets 702, 704 and 706 usually have requests that must met if they are to operate within the user's data processing system (not shown). Generally, the Security Manager 708 is programmed during development with restrictions that (a set of related restrictions is known as a policy) confine an applet to a specified area on a user's disk drive 716. This policy is shown in Security Manager 708 as Sandbox Policy 714 and any applet accepting Sandbox Policy 714 restrictions may operate in Sandbox 718.

The present invention sets two additional policies (or restriction sets) within Security Manager 708. These policies are Public Space Policy 712 and Private Space Policy 710. Public Space Policy 712 and Private Space Policy 710 may be defined by a user as described in FIG. 6A and 6B. If requests by the applets match set policies, in this case Public Space policy 712 and Private Space Policy 710, Security Manager 708 allows applet execution within those pre-defined spaces. As shown, Public Space 720 is an extension of Sandbox 718 and if the requests from an applet meet Public Space Policy 712 restrictions, the applet may operate in Public Space 720. Rarely does the Security Manager 708 allow downloaded applets to operate in Private Space 722. Private Space 722 is the balance of the user's disk drive (non-volatile memory) excluding set policy spaces. However, in the present invention Private Space Policy 710 may allow certain applets to be moved from Public Space 720 to Private Space 722 or may allow applets, that meet policy restrictions of Private Space Policy 710, to operate within the user's disk drive outside of Sandbox 718 and Public Space 720.

An applet is confined to a sandbox or a public space if a security manager is installed with the applicable policies. In the present invention, applets may be allowed to write on the public space during their run time. If there is data left in the public space after the applet has terminated, the client's operating system eliminates that data. However, a less restrictive modality of the present invention may allow applets to leave data in the public space after their execution is terminated, but any executable would be confined to the same public space. Additionally, the user may explicitly move any executable into the private space at the user's option.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for extending Java applet sandbox, utilizing a Java security manager contained within a Java virtual machine installed on a data processing system having a non-volatile memory, a display and a modem for connecting to the Internet, comprising the steps of:

designating a portion of said non-volatile memory as a sandbox as defined by said security manager;

defining restrictions within said security manager for a second portion of said non-volatile memory designated as public storage space by a user of said data processing system;

defining restrictions within said security manager for designating a balance of said non-volatile memory as private storage space; and applying said predefined security restrictions to Java applets.

2. The method of claim 1, wherein designating said second portion of said non-volatile memory as public storage space, further comprises:
   providing restrictions in said security manager for defining said second portion; and
   defining said second portion as an additional protected area in said memory which will permit applet execution.

3. The method of claim 1, wherein designating said balance of said non-volatile memory as private storage space, further comprises:
   providing restrictions in said security manager for defining said balance;
   defining said balance as a protected area; and
   permitting applet execution within said private storage space with explicit permission from said user.

4. The method of claim 1, further comprising storing download Java applets until said security manager determines Java applet security restrictions.

5. A means for extending a Java applet sandbox, utilizing a Java security manager contained within a Java virtual machine installed on a data processing system having a non-volatile memory, a display and a modem for connecting to the Internet, comprising the steps of:
   means within said security manager for designating a portion of said non-volatile memory as a sandbox;
   means for defining restrictions within said security manager for a second portion of said non-volatile memory designated as public storage space by a user of said data processing system;
   means for defining restrictions within said security manager for designating a balance of said non-volatile memory as private storage space; and
   applying pre-defined levels of security restrictions to said Java applets.

6. The means of claim 5, wherein said means for designating said second portion of said non-volatile memory as public storage space, further comprises:
   means for providing restrictions in said security manager for defining said second portion; and
   means for defining said second portion as an additional protected area in said memory which will permit applet execution.

7. The means of claim 5, wherein means for designating said balance of said nonvolatile memory as private storage space, further comprises:
   means for providing restrictions in said security manger for defining said balance;
   means for defining said balance as a protected area; and
   means for permitting applet execution within said private storage space with explicit permission from said user.

8. The means of claim 5, further comprising means for storing downloaded Java applets until said security manager may determine Java applet security levels.

9. A computer program product within a computer-readable medium having instructions for extending a Java applet sandbox, utilizing a Java security manager contained within a Java virtual machine installed on a data processing system having a non-volatile memory, a display and a modem for connecting to the Internet, comprising:
   instructions within said computer-readable medium for enabling said security manager to designate a portion of said non-volatile memory as a sandbox;
   instructions within said computer-readable medium for defining restrictions within said security manager for a second portion of said non-volatile memory designated as public storage space by a user of said data processing system;
   instructions within said computer-readable medium for defining restrictions within said security manager for designating a balance of said non-volatile memory as private storage space; and
   instructions within said computer-readable medium for defining restrictions within said security manager for applying said levels of security restriction to Java applets.

10. The computer program product of claim 9, wherein instructions for designating said second portion of said non-volatile memory as public storage space, further comprises:
    instructions within said computer-readable medium for providing restrictions in said security manager for defining said second portion; and
    instructions within said computer-readable medium for defining said second portion as an additional protected area in said memory which will permit applet execution.

11. The method of claim 9, wherein instructions for designating said balance of said non-volatile memory as private storage space, further comprises:
    instructions within said computer-readable medium for providing restrictions in said security manager for defining said balance;
    instructions within said computer-readable medium for defining said balance as a protected area; and
    instructions within said computer-readable medium for permitting applet execution within said private storage space with explicit permission from said user.

12. The computer program product of claim 9, further comprising instructions within said computer-readable medium for storing downloaded Java applets until said security manager may determine said applet security restrictions.

* * * * *